United States Patent
Thompson

[11] 3,910,847
[45] Oct. 7, 1975

[54] TERTIARY DIAMIDES

[75] Inventor: Robert M. Thompson, Wilmington, Del.

[73] Assignee: Sun Ventures, Inc., St. Davids, Pa.

[22] Filed: Feb. 22, 1974

[21] Appl. No.: 445,008

Related U.S. Application Data

[62] Division of Ser. No. 293,980, Oct. 2, 1972.

[52] U.S. Cl. .................. 252/77; 252/67; 252/70; 260/561 K; 260/561 R
[51] Int. Cl.² .................................................. C09K 5/00
[58] Field of Search .................. 252/77, 75, 70, 67; 260/561 K, 561 R

[56] References Cited
UNITED STATES PATENTS

| | | | |
|---|---|---|---|
| 2,304,475 | 12/1942 | Pool | 260/561 K |
| 2,594,286 | 4/1952 | Bryant et al. | 260/561 K X |
| 2,765,337 | 10/1956 | Benneville et al. | 260/561 K |
| 3,288,794 | 11/1966 | Kuceski | 260/404.5 X |
| 3,417,114 | 12/1968 | Kuceski | 260/404 |

OTHER PUBLICATIONS

Chiba et al., Chem. Abs., 65: PC20325g.
Druesne et al., Chem. Abs., 75: P5294g.

*Primary Examiner*—Harris A. Pitlick
*Attorney, Agent, or Firm*—George L. Church; Donald R. Johnson; Anthony Potts, Jr.

[57] ABSTRACT

This invention relates to novel liquid tertiary diamides having the following structural formula:

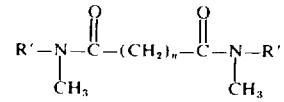

wherein $n = 4-12$

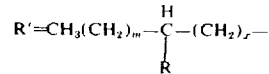

wherein $R = $ H, alkyl radical having $C_1$–$C_5$
$m = 2$–$8$
$x = 1$–$5$ These diamides are water-white. They are useful as heat transfer fluids and plasticizers.

5 Claims, No Drawings

TERTIARY DIAMIDES

This is a division of application Ser. No. 293,980, filed Oct. 2, 1972.

CROSS-REFERENCES TO RELATED APPLICATIONS

This invention is related to those described in the following listed applications:

| Serial Numbers | Inventors |
| --- | --- |
| 293,979 | R. M. Thompson |
| 293,981 | R. M. Thompson |
| 293,982 | R. M. Thompson |
| 293,984 | R. M. Thompson and F. E. Didot |
| 293,983 | R. M. Thompson and A. F. Talbot |

All of the aforementioned applications filed the same date as this application. The first of the aforementioned applications relates to another class of diamides; the second and third relate to the use of certain diamides as lubricants; the fourth to the use of certain diamides as swelling agents and the last one to the use of certain diamides as a component of greases.

Ser. Nos. 293,981 and 293,984 have been abandoned. Ser. No. 293,982 is now U.S. Pat. No. 3,827,981, issued Aug. 6, 1974. Ser. No. 293,983 is now U.S. Pat. No. 3,827,980, issued Aug. 6, 1974.

SUMMARY OF THE INVENTION

This invention pertains to novel tertiary diamides having the following structural formula:

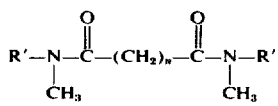

wherein
$n = 4-12$

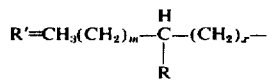

wherein
$R = H$, alkyl radical having $C_1-C_5$
$m = 2-8$
$x = 1-5$

These diamides are water-white liquids at ambient temperatures and have useful physical properties. This invention also pertains to the use of these diamides as heat transfer fluids and plasticizers.

DESCRIPTION OF THE INVENTION

The novel tertiary diamides of this invention can be prepared by reacting a normal paraffinic diacid with a secondary amine wherein one radical is a methyl. This general reaction is illustrated by the following equation:

(1) 

The normal paraffinic diacid of equation (1) can contain 6–14 carbon atoms; preferably 8–12. Accordingly $n$ of the diacid of equation (1) equals 4–12, preferably 6–10. Examples of such acids are suberic, azelaic and sebacic. The secondary amine of equation (1) contains a methyl and R'. The latter,

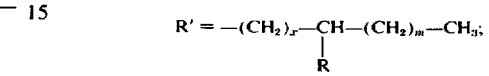

wherein $x = 1-5$, $R = H$ or an alkyl radical containing $C_1-C_5$ and $m = 2-8$. A preferred R' is one wherein $x = 1$; more preferably $x = 1$ and $R = H$ and $m = 3-6$. Preparation of primary and secondary amines and the physical and chemical properties of the amines are given in Kirk-Othmer, ENCYCLOPEDIA OF CHEMICAL TECHNOLOGY, 2nd Edition, Volume 2, Amines (Survey).

Another method involves reacting a normal paraffinic diacylhalogen, e.g. a diacylchloride, with a secondary amine wherein one radical is a methyl. This general reaction is illustrated by the following equation:

(2) 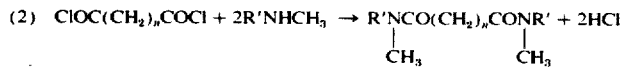

In equation (2) $n$, as in equation (1), equals 4–12; preferably 6–10. R' is the same as in general equation (1).

The tertiary diamides of present invention have many properties which make them excellent heat transfer media. Among these properties are that they are generally innocuous towards metals; have relatively good thermal stability, have high boiling points and are liquid at ambient temperature. A comprehensive discussion of heat-transfer media other than water is given in Kirk-Othmer, ENCYCLOPEDIA OF CHEMICAL TECHNOLOGY, 2nd Edition, Volume 10. Also, because of their high boiling points, the tertiary diamides have utility as a plasticizer. The latter is generally an organic compound added to some solid polymers, both to facilitate processing and to increase the flexibility and toughness of the final product by internal modification of the polymer molecule.

Following are several examples of how the tertiary diamides of present invention were prepared, also reported are their physical properties.

EXAMPLES

1. Preparation of N,N'-Dimethyl-N,N'-Dioctylazelamide 30 grams of azelic acid and 45.7 grams of N-methyl-N-octylamine were charged to a three-neck flask equipped with a magnetic stirring bar thermometer, Dean Stark trap and condenser and nitrogen inlet. The resulting mixture in the flask was heated to a temperature of 180°–190°C., with stirring, and maintained at that temperature until no more water, a reaction by-product, came over into the Dean Stark trap.

Afterwards, the heating was stopped, the flask and its contents were allowed to cool. After cooling, 150 milliliters of ether were added to the contents in the flask, and then the ether solution was first washed with a dilute HCl solution, then washed with a 10% aqueous $Na_2CO_3$ solution and finally washed with just water. Any water in the ether solution was removed by contacting the solution with $MgSO_4$. Afterwards, the ether was removed by a vacuum. The resulting product had a yellowish, oily appearance. The yellowish tint was believed to be caused by trace impurities.

The product was then distilled in a highly efficient, low holdup distillation column; its boiling point was 176°C. at 0.17 mm Hg.

After the distillation, 45 grams of a water-white oily appearing product was obtained. The weight % nitrogen of the product measured 5.16% compared to a calculated 4.9% for $C_{18}H_{37}NO$. The product had a density of 0.9174 at 26°C.; its refractive index, $\eta_D 20$, was 1.4557.

2. Preparation of N,N'-Dimethyl-N,N'-Di-2-Ethylhexylazelamide 45 grams of a yellowish, oily appearing liquid were obtained from the reaction of 38.6 grams of azelaic acid and 59.6 grams of N-methyl-N-2-ethyl-hexylamine via the procedure detailed for the aforementioned undistilled diotcylazelamide. The yellowish liquid of this preparation was not distilled. Again the yellowish tint was believed to be caused by traces of impurities. The infrared absorption bands of the product were typical of tertiary amides; also no amine or carboxyl absorption bands were present. The weight % nitrogen of the product measured 5.16% compared to a calculated 6.6% for $C_{27}H_{54}N_2O_2$. Its refractive index, $\eta_D 20$ was 1.4764.

3. Preparation of N,N'-Dimethyl-N,N'-Di-2-Ethylhexylsebacamide 20 grams of a yellowish, oily appearing liquid were obtained from the reaction of 38 grams of sebacic acid and 25 grams of N-methyl-N-2-ethylhexylamine via the procedure detailed for the aforementioned di-2-ethylhexylazelamide.

The infrared absorption bands of the yellowish product were typical of tertiary amides; also, no amine or carboxyl absorption bands were present. Its density was 0.9211 at 26°C.; the weight of N measured 6.66% compared to a calculated 6.2% for $C_{28}H_{56}N_2O_2$; its refractive index, $\eta_D$, was 1.4760.

4. Preparation of N,N'-Dimethyl-N,N'-Dihexylazelamide 10.5 grams of azeloyl diacylchloride were placed in a container holding 140 milliliters of tetrachloroethylene and dissolved. To the resulting mixture were added 9.2 grams of N-methyl-N-hexylamine, and 1.6 grams of NaOH dissolved in 200 milliliters of water. The completed mixture was agitated vigorously for ten minutes; afterwards the organic layer was separated and washed with a dilute aqueous HCl solution. Following this the organic layer was first washed with a 10% aqueous $Na_2CO_3$ solution and afterwards washed with water. The washed organic layer was dried by contacting with $MgSO_4$ and then the tetrachloroethylene was removed by application of a vacuum.

The resulting product, 5.2 grams, had a slightly yellow, oily appearance. The yellowish color was believed to be caused by traces of impurities. The infrared absorption bands of the product were typical of tertiary amides; also no amine or carboxyl absorption bands were present.

The resulting product was thermally stable. It was placed in a container and kept in an oven maintained at 300°F. for 3 days. After 3 days, no sludge had formed so the test was stopped.

Analogous results are obtained when diacids, other than the aforementioned ones, such as suberic, pimelic and adipic are used. Also, analogous results are obtained when other secondary amines such as N-methyl-N-heptylamine, N-methyl-N-octylamine and N-methyl-N-nonylamine and other saturated aliphatic diacylhalogens such as suberoyl chloride, pimeloyl chloride and adipoyl chloride are used.

what is claimed is:

1. In a process for transferring heat by means of an organic heat exchange fluid, the improvement which consists essentially of employing as the fluid at least one tertiary diamide having the following structural formula:

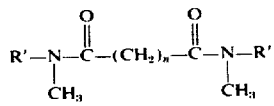

wherein $n = 4-12$

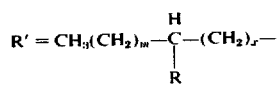

wherein $R = H$, alkyl radical having $C_1-C_5$ $m = 2-8$ $x = 1-5$.

2. The improvement according to claim 1 wherein the fluid is N,N'-dimethyl-N,N'-dihexylazelamide.

3. The improvement according to claim 1 wherein the fluid is N,N'-dimethyl-N,N'-dioctylazelamide.

4. The improvement according to claim 1 wherein the fluid is N,N'-dimethyl-N,N'-di-2-ethylhexylazelamide.

5. The improvement according to claim 1 wherein the fluid is N,N'-dimethyl-N,N'-di-2-ethylhexylsebacamide.

* * * * *